(12) United States Patent
Kang et al.

(10) Patent No.: US 9,958,132 B2
(45) Date of Patent: May 1, 2018

(54) OPTICAL ELEMENT AND LIGHT EMITTING DEVICE INCLUDING THE SAME

(71) Applicant: LG INNOTEK CO., LTD., Seoul (KR)

(72) Inventors: Lee Im Kang, Seoul (KR); Chang Hyuck Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 141 days.

(21) Appl. No.: 14/563,143

(22) Filed: Dec. 8, 2014

(65) Prior Publication Data

US 2015/0159831 A1  Jun. 11, 2015

(30) Foreign Application Priority Data

Dec. 9, 2013  (KR) .................. 10-2013-0152403

(51) Int. Cl.

| F21V 7/04 | (2006.01) |
| F21V 5/00 | (2018.01) |
| F21V 5/04 | (2006.01) |
| G02F 1/1335 | (2006.01) |
| G02B 19/00 | (2006.01) |
| F21V 13/04 | (2006.01) |
| F21V 13/10 | (2006.01) |

(52) U.S. Cl.
CPC .............. F21V 5/007 (2013.01); F21V 5/04 (2013.01); F21V 13/04 (2013.01); F21V 13/10 (2013.01); G02B 19/0028 (2013.01); G02B 19/0061 (2013.01); G02F 1/133606 (2013.01); G02F 2001/133607 (2013.01)

(58) Field of Classification Search
CPC ......... G02F 1/133603; G02F 1/133605; G02F 1/133606; F21S 48/1225

USPC ......................................................... 362/612
See application file for complete search history.

(56) References Cited

U.S. PATENT DOCUMENTS

| 6,974,229 | B2 * | 12/2005 | West ................ G02F 1/133603 |
| | | | 362/227 |
| 2006/0083003 | A1 * | 4/2006 | Kim ......................... F21V 5/04 |
| | | | 362/327 |
| 2007/0047232 | A1 | 3/2007 | Kim et al. |
| 2008/0067531 | A1 | 3/2008 | Chang |
| 2008/0074862 | A1 | 3/2008 | Chang |
| 2008/0144323 | A1 | 6/2008 | Chang |
| 2012/0155092 | A1 | 6/2012 | Hsueh et al. |
| 2013/0088857 | A1 * | 4/2013 | Lee .................... G02B 19/0028 |
| | | | 362/97.1 |

(Continued)

FOREIGN PATENT DOCUMENTS

| EP | 2 594 978 A1 | 5/2013 |
| KR | 10-2010-0031397 A | 3/2010 |
| KR | 10-2011-0121595 A | 11/2011 |

OTHER PUBLICATIONS

European Search Report dated Apr. 14, 2015 issued in Application No. 141969378.8.

*Primary Examiner* — William Carter
(74) *Attorney, Agent, or Firm* — KED & Associates, LLP

(57) ABSTRACT

An optical element includes a lens includes a surface of incidence on which light is incident from a light source, a first optical surface recessed toward the light source, and a second optical surface extending from the first optical surface, and a cover arranged on the lens to cover at least a part of the first optical surface.

11 Claims, 5 Drawing Sheets

(56) References Cited

U.S. PATENT DOCUMENTS

2014/0111973 A1\* 4/2014 Wang He ........... G02B 27/0927
362/97.1

\* cited by examiner

OPTICAL ELEMENT AND LIGHT EMITTING DEVICE INCLUDING THE SAME

CROSS-REFERENCE TO RELATED APPLICATION

This application claims priority under 35 U.S.C. § 119 to Korean Application No. 10-2013-0152403 filed on Dec. 9, 2013, whose entire disclosure is incorporated herein by reference.

BACKGROUND

1. Field

The present application relates to an optical element and a light emitting device including the same.

2. Background

A liquid crystal display (LCD) is a device which converts a variety of kinds of electrical information generated from various devices into visible information using a change in a liquid crystal transmittance according to an applied voltage, and transmits the visible information. The LCD needs back light because it does not have self-luminosity. Because the LCD consumes low power, has a light weight and a thin thickness, it is used widely. A backlight unit (BLU) serving as a light emitting device providing light should be provided at a rear surface of a liquid crystal panel on which an image is displayed.

The LCD includes the liquid crystal panel including a color filter substrate and an array substrate spaced a predetermined distance from each other to face each other, a liquid crystal layer interposed between the color filter substrate and the array substrate, and the BLU configured to irradiate the liquid crystal panel with light.

The BLU used in the LCD may be classified into an edge type and a direct type according to a position of a light emitting diode serving as a light source.

In the edge type BLU, the light emitting diodes serving as light sources are arranged at a side surface of a light guide panel, and the light guide panel irradiates to the liquid crystal panel with light radiated from the light emitting diodes through total reflection or the like.

In the direct type BLU, a diffusion plate is used instead of the light guide plate, and the light emitting diodes are disposed at a rear surface of the liquid crystal panel. Therefore, the light emitting diodes irradiate the rear surface of the liquid crystal panel with light.

Meanwhile, in the LCD, brightness uniformity is an important factor which determines quality of the LCD, and thus it is necessary for the BLU to uniformly irradiate the liquid crystal panel with the light.

BRIEF DESCRIPTION OF THE DRAWINGS

The embodiments will be described in detail with reference to the following drawings in which like reference numerals refer to like elements wherein.

DETAILED DESCRIPTION

Figure 1:
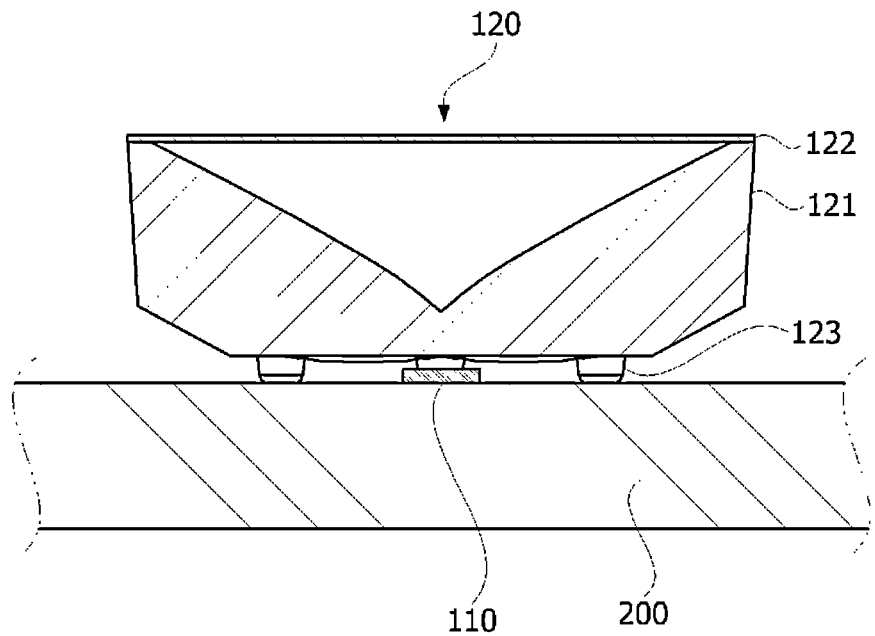
FIG. 1 is a side cross-sectional view of a light emitting device according to one embodiment of the present application.

Referring to FIG. 1, the light emitting device includes a light source 110, an optical element 120, a driving substrate 200, and the like. The light source 110 is arranged on the driving substrate 200, and electrically connected to a circuit pattern formed on the driving substrate 200. The light source 110 serves to receive an electric signal from the circuit pattern of the driving substrate 200, to convert the electric signal into an optical signal, and to output the converted optical signal. For example, a light emitting diode acting as a point light source is used as the light source 110.

The optical element 120 may include a lens 121, a cover 122 arranged on the lens 121, and the like. Further, the optical element 120 may further include at least one supporting part 123 provided at a surface of incidence of the lens 121 to support the lens 121 on the driving substrate 200.

In the lens 121 and the cover 122, faces which face each other may be partly bonded by an adhesive member, such as a sheet and a film, containing a polyimide-based resin or an epoxy resin impregnated in a glass fiber. The lens 121 may be disposed on the light emitting element 110 to cover at least part of an outer surface of the light emitting element 110. The lens 121 is a luminous flux control member which refracts light incident from the light emitting element 110 and controls a light path, thereby enhancing brightness uniformity of the light emitting device.

As illustrated in FIG. 1, the lens 121 may be provided to be separated from the light source 110. In this case, the light emitted from the light source 110 may be incident on the lens 121 through one surface arranged to be opposed to the light source 110. The surface of incidence may be realized at an outer surface of the lens 121.

Further, the lens 121 may be formed in an integrated optical lens (IOL) type in which at least a part of the light source 110 is received in the lens 121, i.e., may be formed integrally with the light source. In this case, the light emitted from the light source 110 may be incident on the lens 121 through a boundary surface in which the lens 121 is in contact with an outer surface of the light source 110. The boundary surface in which the lens 121 is in contact with an outer surface of the light source 110 may serve as the surface of incidence on which the light is incident from the light source 110.

Figure 2:
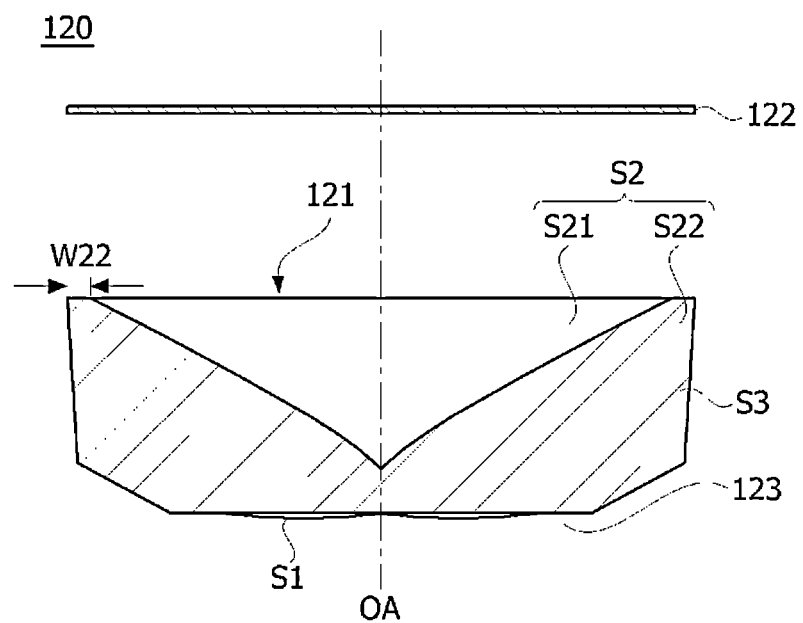
FIGS. 2 and 3 are exploded cross-sectional views of an optical element according to one embodiment of the present application.

Referring to FIG. 2, the lens 121 includes a surface S1 of incidence on which the light is incident from the light source 110, a first optical surface S2 formed to be recessed toward the light source 110, and a second optical surface S3 formed to extend from an outside of the first optical surface S2, and may be realized in a solid type. FIG. 2 illustrates an example of a lens shape of the optical element according to one embodiment of the present application, but the embodiment of the present application is not limited thereto. The lens shape of the optical element according to one embodiment of the present application may be changed variously.

When the light source 110 is located at an outer side of the lens 121, the surface S1 of incidence may be formed at a lower surface of the lens 121 opposed to the light source 110.

Meanwhile, in FIG. 1, for example, a case in which the light source is located at the outer side of the lens 121 is illustrated. However, the IOL type in which the lens 121 has the light source accommodated therein may be used. In this case, the surface of the incidence of the lens 121 may be an inner surface thereof corresponding to the boundary surface between the lens 121 and the light source rather than the outer surface of the lens 121.

The surface S1 of incidence may be a spherical or aspherical surface. A cross section of the surface S1 of incidence cut in an X or Y-axial direction may include a linear section. The cross-section of the surface S1 of incidence cut in an X or Y-axial direction may include a curved section.

Cutting in the X-axial direction means cutting the lens 121 in a direction vertical to an optical axis OA, and cutting in the Y-axial direction means cutting the lens 121 in an axial direction of the optical axis OA. For example, FIG. 1 illustrates an example in which the lens 121 is cut in the Y-axial direction. The optical axis OA is a virtual straight line which indicates a moving direction of the light at a center of a three-dimensional luminous flux emitted from a point light source. The optical axis OA axis may coincide with a virtual axis which extends to pass through centers of the first optical surface S2 formed at an upper portion of the lens 121 and the surface S1 of incidence formed at a lower portion of the lens 121.

The surface S1 of incidence may include one or more concave portion formed to be recessed toward the upper portion of the lens 121. In this case, a part or whole of the light source 110 may be accommodated in the concave portion formed in the lower surface of the lens 121. The light emitted from the light source 110 may be incident on the lens 121 through an inner surface of the concave portion.

The surface S1 of incidence may include one or more convex portion formed to protrude toward the light source 110. The surface S1 of incidence may be rotationally symmetric about the optical axis OA. Further, the surface S1 of incidence may be rotationally asymmetric about the optical axis OA.

The first optical surface S2 is an optical surface which reflects or refracts the incident light which passes through the surface S1 of incidence, and may be provided opposite to the surface S1 of incidence. The first optical surface S2 may include a concave portion S21 formed at a center portion thereof to be recessed toward the light source.

A vertex of the concave portion S21 may be located on the optical axis OA. The concave portion S21 may be rotationally symmetric about the optical axis OA. Further, the first optical surface S2 may be rotationally asymmetric about the optical axis OA. The concave portion S21 may be a spherical or aspherical surface.

A cross section of the concave portion S21 cut in an X or Y-axial direction may include a linear section. For example, the cross section of the concave portion S21 cut in the Y-axial direction may be formed in a linear cone shape. The cross section of the concave portion S21 cut in an X or Y-axial direction may include a curved section.

The first optical surface S2 may further include a flat surface S22 formed at an edge portion thereof in parallel with a lower surface of the cover 122. The flat surface S22 is a surface which is bonded to one surface of the cover 122 by an adhesive member (not shown), and may be formed to have a predetermined width W22 and thus to prevent the cover 122 from being separated. The width W22 of the flat surface S22 may be changed according to lens properties such as a size and a shape of the lens 121. For example, the flat surface S22 may be provided to have a width W22 of 0.5 mm to 1 mm.

Figure 3:
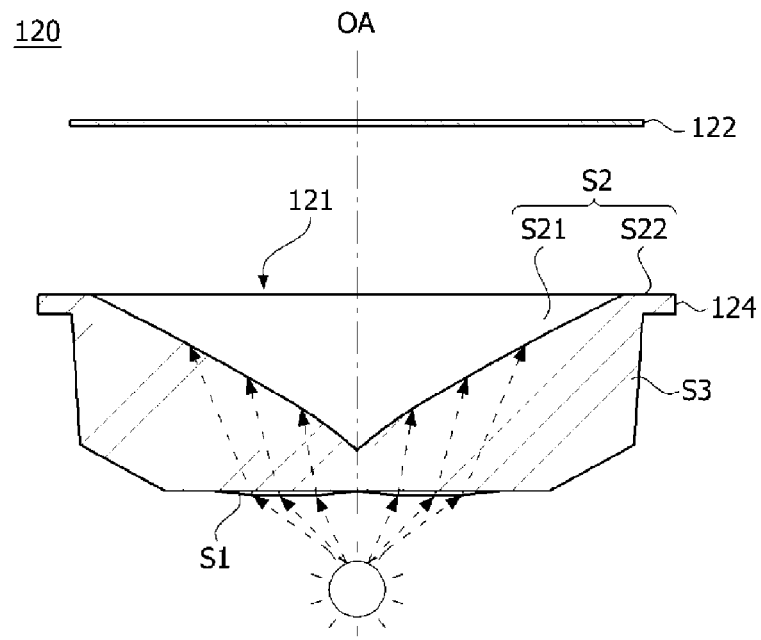

In FIGS. 1 and 2, for example, a case in which the cover 122 is attached on the flat surface S22 of the lens 121 is illustrated. However, when it is difficult to form the flat surface S22 due to the properties of the lens 121, or the width W22 of the flat surface S22 is not sufficient, the cover 122 may be attached on the lens 121 through a separate flange 124 formed to extend from the first optical surface S2, as illustrated in FIG. 3.

The second optical surface S3 is an optical surface which reflects or refracts the incident light which passes through the surface S1 of incidence, and may be formed to be bent or curved from an edge of the first optical surface S2 and then to extend. The second optical surface S3 may extend downward from the first optical surface S2 to form an outer surface of the luminous flux control member.

In the specification, the bending means a shape which is sharply bent. For example, when two surfaces are bent to form a curved surface having a radius of curvature of about 0.1 mm or less, it may be said that the two surfaces are bent. Further, the curving means a shape which is gently bent. For example, when two surfaces are bent to form a curved surface having a radius of curvature larger than about 0.1 mm, it may be said that the two surfaces are curved. Further, an inflecting means a shape in which a curved surface is bent, while variation tendency of the curved surface is changed. For example, when a convexly curved surface is bent and changed into a concavely curved surface, it may be said that the curved surface is inflected.

The second optical surface S3 may be rotationally symmetric about the optical axis OA. Further, the second optical surface S3 may be rotationally asymmetric about the optical axis OA. The second optical surface S3 may be a spherical or aspherical surface.

A cross section of the second optical surface S3 cut in an X or Y-axial direction may include a linear section. The cross-section of the second optical surface S3 cut in an X or Y-axial direction may include a curved section.

A part region of the second optical surface S3 may be formed in a concave shape to be recessed toward an inner side of the lens 121. Further, the part region of the second optical surface S3 may be formed in a convex shape to protrude toward an outer side of the lens 121.

The cross-section of the second optical surface S3 may include the linear or curved section that is farther from the optical axis OA toward the top. Further, the cross-section of the second optical surface S3 may include the linear or curved section that is closer to the optical axis OA toward the top.

Referring to FIG. 1 again, the cover 122 serves to absorb, reflect or refract some of the light output from the first optical surface S2 of the lens 121, and thus to control an amount of light moving to a center portion of the light emitting device. Here, the center portion of the light emitting device means a predetermined region centering on the optical axis OA.

Most of the light passing through the first optical surface S2 and incident on the cover 122 is moved to the center portion of the light emitting device. Therefore, the cover 122 serves to absorb, reflect or refract some of the light incident from the first optical surface S2 of the lens 121, to prevent the light from being concentrated to the center portion of the light emitting device, and to prevent mura in which the center portion of the light emitting device becomes too bright, thereby widening a cover region of the light emitting device.

To this end, the cover 122 may have a light transmittance of 70% or less. That is, the cover 122 may be provided so that a ratio (hereinafter referred to as a "light transmittance") of the light passing through the cover 122 and moving to the center portion of the light emitting device to the light incident on the surface of incidence of the cover 122 from the first optical surface S2 is 70% or less.

The cover 122 may be disposed to cover at least a part of the optical surface S2 of the lens 121. The cover 122 may be designed to have a surface area which is the same as or smaller than a cross-sectional area of the lens 121 cut parallel to the cover 122, such that the light transmittance with respect to only the light moving to the center portion of the light emitting device is controlled.

The cover 122 may be provided by forming a coating layer on a substrate. For example, the cover 122 may be provided by forming the coating layer such as polymethyl methacrylate on the substrate formed of an acryl resin, such as polymethyl metaacrylate (PMMA), or a polyethylene terephthalate (PET) resin, a poly carbonate (PC) resin, a cycloolefin copolymer (COO) resin, or a polyethylene naphthalate (PEN) resin.

The cover 122 may include a reflecting sheet. In this case, the cover 122 may reflect some of the light incident on the surface of incidence of the cover 122 from the first optical surface S2 of the lens 121, and thus may control the light transmittance.

When a reflecting layer is provided on the surface of incidence of the cover 122, the light reflected by the cover 122 may be moved to an edge region of the light emitting device rather than the center portion thereof by the lens 121. Therefore, the mura is improved, and the cover region of the lens 121 is also increased.

Further, the cover 122 may include a diffusion sheet. In this case, the cover 122 reflects some of the light incident on the surface of incidence of the cover 122 from the first optical surface S2 of the lens 121, and moves it to another region other than the center portion of the light emitting device.

Figure 4:
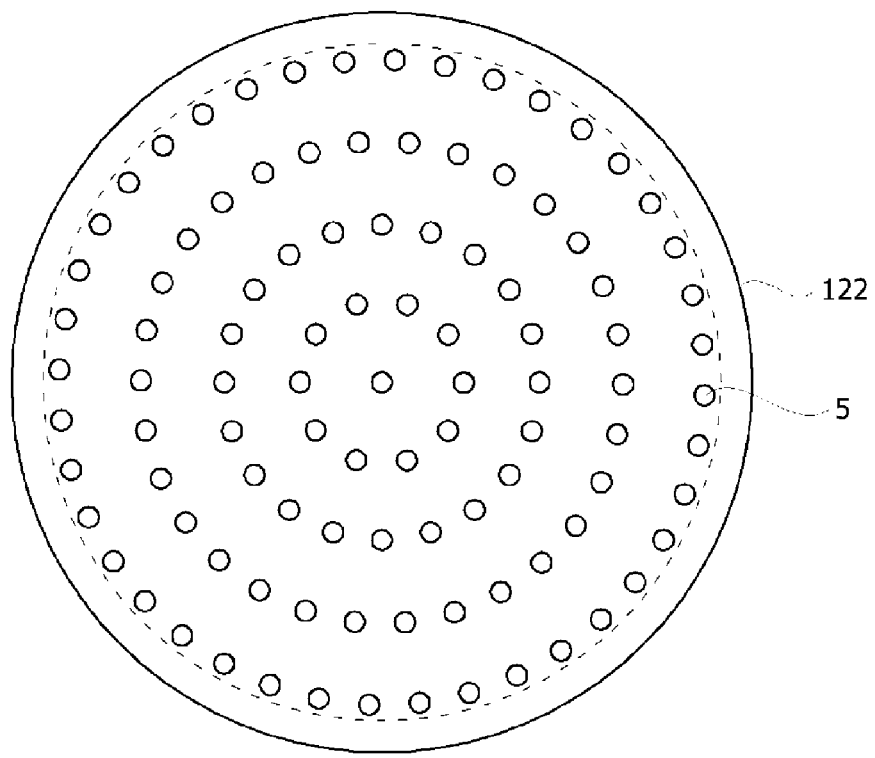
FIG. 4 is a view illustrating an example of a cover according to one embodiment of the present application.

Also, as illustrated in FIG. 4, the cover 122 may include a plurality of through-holes 5 through which only some of the light incident on the surface of incidence of the cover 122 from the first optical surface S2 of the lens 121 passes. When the cover includes the plurality of through-holes to control the light transmittance, the cover 122 may be formed of a material having a lower light transmittance than a predetermined value, or the reflecting layer is formed on the surface of incidence, and thus most of the light incidence on another region other than the through-holes may be absorbed or reflected.

Further, the light transmittance may be controlled by controlling a size and a distribution of the through-holes. For example, assuming that most of the light incident on another surface other than the through-holes is reflected or absorbed, a total area occupied by the plurality of through-holes 5 in the cover 122 may be controlled to 70% or less, and thus the light transmittance of the cover 122 may be controlled to 70% or less.

The cover 122 may be formed to have different thicknesses according to a property of the light emitting device, a shape of the lens or the like. For example, when the light emitting device is used as a backlight unit of an LCD, the cover 122 may have a thickness of 500 um or less.

In FIG. 1, for example, a case in which one light emitting device 110 and one optical element 120 are arranged at one driving substrate 200 is illustrated. However, the embodiment of the present application is not limited thereto. For example, a plurality of light emitting devices may be arranged at one driving substrate 200. Also, for example, a plurality of optical elements 120 may be arranged to correspond to one light emitting device 110.

As described above, in the light emitting device according to one embodiment of the present application, the optical element in which the cover having the transmittance of 70% or less is coupled to an upper surface of the lens is applied so as to reduce the light reaching the center portion of the light emitting device, and thus it is possible to solve problems in which the light emitted from the light source is concentrated to the center portion of the light emitting device, and the mura occurs, and the cover region becomes narrow.

Figure 5:
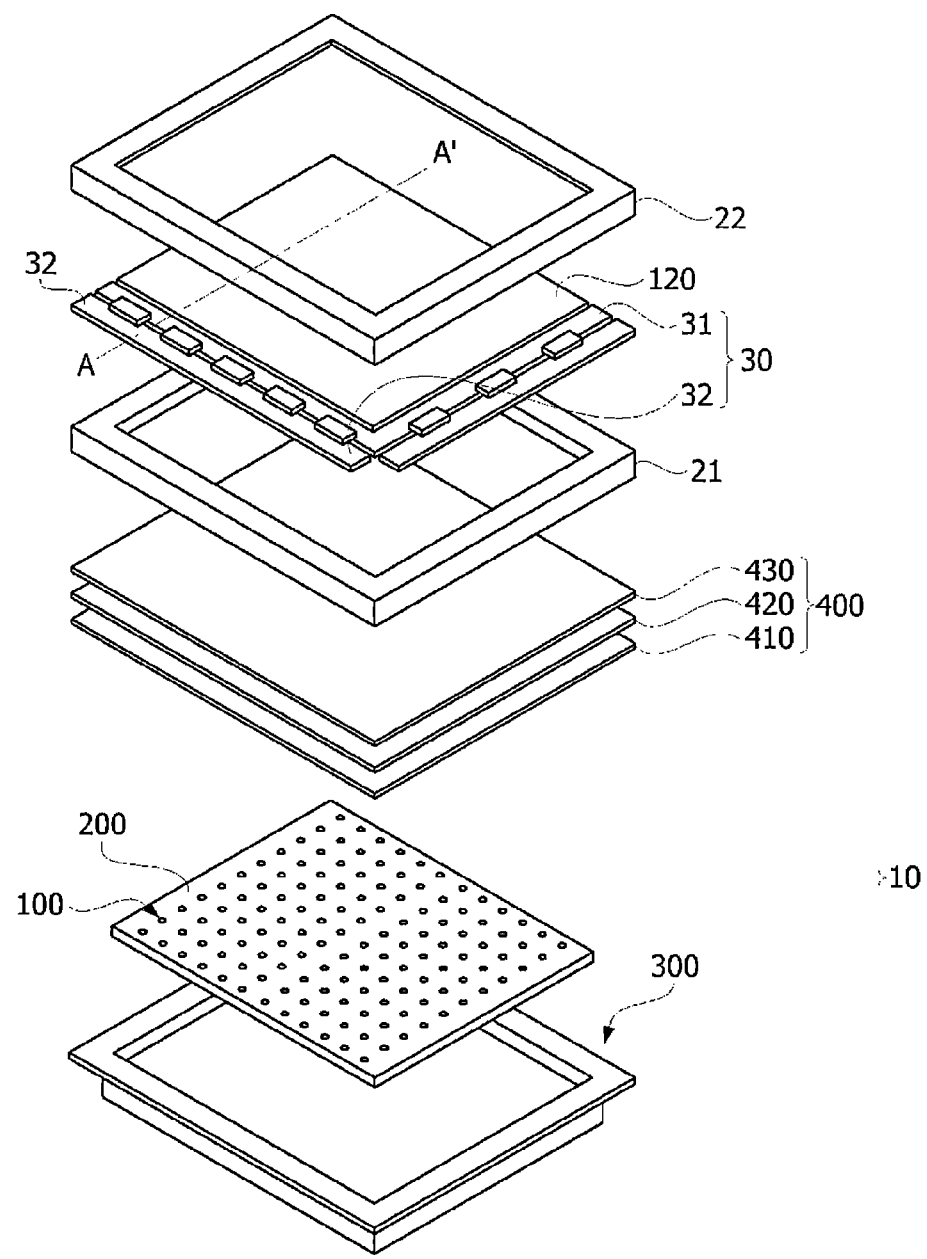
FIG. 5 is an exploded perspective view illustrating a liquid crystal display according to one embodiment of the present application.

FIG. 5 is an exploded perspective view illustrating an LCD according to one embodiment of the present application, which illustrates the LCD including the light emitting device described with reference to FIGS. 1 to 4. Further, FIG. 6 is a cross-sectional view of a backlight unit including the light emitting device according to one embodiment of the present application which is taken along line A-A'.

Figure 6:
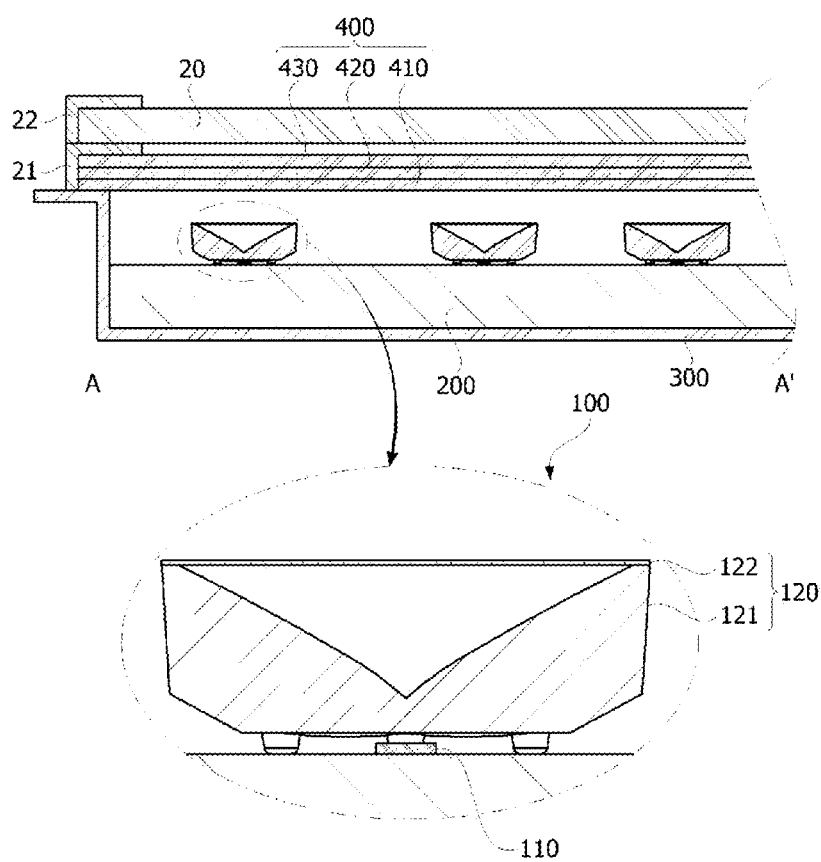
FIG. 6 is a cross-sectional view of a backlight unit including the light emitting device according to one embodiment of the present application which is taken along line A-A'.

Referring to FIGS. 5 and 6, the LCD includes a backlight unit 10 and a liquid crystal panel 20. The liquid crystal panel 20 is a displaying part of the LCD, and may include a thin film transistor (TFT) substrate, a color filter substrate, and a liquid crystal layer interposed between the two substrates. The TFT substrate includes a plurality of gate lines, a plurality of data lines crossing the plurality of gate lines, and a TFT formed at a crossed region of each gate line and each data line.

A driving circuit part 30 may be connected to one side of the liquid crystal panel 20. The driving circuit part 30 includes a printed circuit board (PCB) 31 which supplies a scan signal to the gate lines of the TFT substrate, and a PCB 32 which supplies a data signal to the data lines thereof. The driving circuit part 30 is electrically connected with the liquid crystal panel 20 in a chip-on-film (COF) manner, a tape carrier package (TCP) manner or the like.

The LCD may further include a panel guide 21 configured to support the liquid crystal panel 20, and an upper case 22 configured to cover an edge of the liquid crystal panel 20 and coupled with the panel guide 21. The backlight unit 10 is coupled to the liquid crystal panel 20 in a direct type, and may include a bottom cover 300, a driving substrate 200, a plurality of light sources 100, and a plurality optical sheets 400.

The bottom cover 300 may be formed of a metallic material, and may be formed in a box shape of which an upper portion is opened. For example, the bottom cover 300 may be formed by bending or curving a metal plate.

The driving substrate 200 is formed in a plate shape, and the reflecting layer may be formed on the driving substrate 200. The reflecting layer serves to reflect the light emitted from the light emitting diode 110 and to enhance performance of the backlight unit 10.

Figure 7:
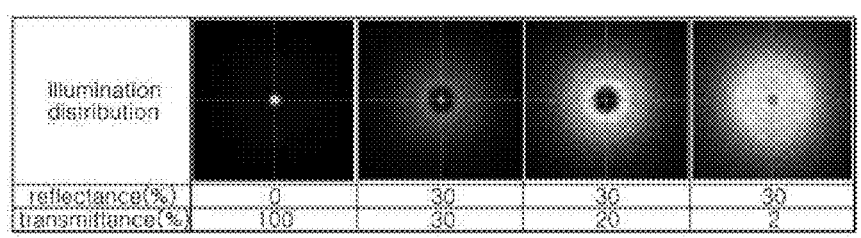
FIGS. 7 and 8 are views illustrating an effect in which mura is improved by applying the optical element according to one embodiment of the present application.

The plurality of light sources 100 may be mounted on the driving substrate 200. Each light source 100 may include a light emitting element 110 and a lens 121 disposed to cover the light emitting element 110. In FIGS. 6 and 7, for example, a case in which the light emitting diode is used as the light emitting element 110 is illustrated.

Each light emitting diode 110 is arranged on the driving substrate 200, and electrically connected to the driving substrate 200. The light emitting diode 110 emits the light according to a driving signal supplied from the driving substrate 200.

Each light emitting diode 110 operates as a point light source, and an array of the light emitting diodes 110 arranged on the driving substrate 200 at regular intervals may form a surface light source. Each light emitting diode 110 may be formed in a light emitting diode package including a light emitting diode chip. Each light emitting diode 110 may radiate white light, or may uniformly radiate blue, green and red light.

The optical element 120 serves to control the luminous flux and the transmittance of the light radiated from the light emitting diode 110 through the lens 121 and the cover 122 coupled to an upper portion of the lens 121, and thus to enhance the brightness uniformity of the backlight unit 10.

When the light radiated from the light emitting diode 110 is incident on the lens 121, the lens 121 serves to controls the luminous flux and to enhance the brightness uniformity. The lens 121 may be provided to be separated from the lens 121. Also, the lens 121 may be provided in the IOL type in which the light emitting diode 110 is accommodated therein.

The cover 122 is bonded on the lens 121 to cover at least a part of an upper surface of the lens 121 by the adhesive member (not shown), and provided to have a light transmittance of 70% or less. Among the light passing through the lens 121 and incident on the cover 122, the cover 122 may pass only some of the light moving to a specific region, i.e., a region corresponding to the center portion of the light emitting diode 110, and thus a phenomenon in which the light is concentrated to the center portion of the light emitting diode 110 may be improved.

Meanwhile, in FIGS. 5 and 6, for example, the optical elements 120 are arranged at regular intervals, but the embodiment of the present application is not limited thereto. According to the embodiments of the present application, the plurality of optical elements 120 arranged at regular intervals to correspond to each light emitting diode 110 may be coupled to each other to form one structure.

The optical sheet 400 may include a diffusion sheet 410, a polarizing sheet 420, a prism sheet 430 and the like, and may be used to enhance the light property passing through the optical sheet 400. The diffusion sheet 410 serves to direct the light incident from the light sources 100 to a front of the liquid crystal panel 20, to diffuse the light to have a uniform distribution over a wide area, and then to emit the light to the liquid crystal panel 20.

The polarizing sheet 420 serves to polarize the light slantly incident on the polarizing sheet 420, and to output the light vertically. To change the direction of the light output from the diffusion sheet 410 to a vertical direction, at least one polarizing sheet 420 may be arranged under the liquid crystal panel 20. The prism sheet 430 passes the light in parallel with a transmission axis thereof, and reflects the light vertical to the transmission axis.

Meanwhile, to ensure illumination uniformity in the backlight unit 10, it is necessary to form an air gap having a predetermined size between the light emitting diode 110 and the lens 121. Also, to have the wide illumination distribution, it is necessary to reduce a size of the light emitting diode 110 or increase a size of the lens 121, and thus to ensure the illumination uniformity.

Recently, as the demand for a TFT-LCD increases, attempts to reduce the air gap between the light emitting diode 110 and the lens 121 are continuously proceeded. However, there is limitation in reducing the size of the lens 121 due to the reduced air gap, and thus it is difficult to ensure the illumination uniformity. In particular, when the backlight unit 10 is designed to have a thickness of 10 mm or less, the light is concentrated to the center portion of the light source 100, and the mura in which the center portion of the light emitting device becomes too bright occurs, and the cover region covered by one light source is also reduced.

Therefore, in the embodiment of the present application, since the cover 122 which blocks some of the light concentrated to the center portion of the lens 121 is coupled to the lens 121, the light output from the light emitting diode 110 may be effectively prevented from being concentrated to the center portion of the light source 100, and the cover region covered by the one light source 100 may be increased.

FIG. 7 illustrates an example of the illumination distribution of the light emitting element obtained while a reflectance and a transmittance of the cover 122 coupled on the lens 121 are adjusted. Further, FIG. 8 illustrates an example of the illumination distribution of the light emitting element obtained before and after the cover 122 is applied, while a window size of the LCD is changed.

Referring to FIG. 7, as the light transmittance of the cover 122 is lowered, the phenomenon in which the light is concentrated to the center portion of the light emitting device may be improved. Further, the cover region of the light emitting device may also be increased by controlling the transmittance and the reflectance of the cover 122.

Figure 8:
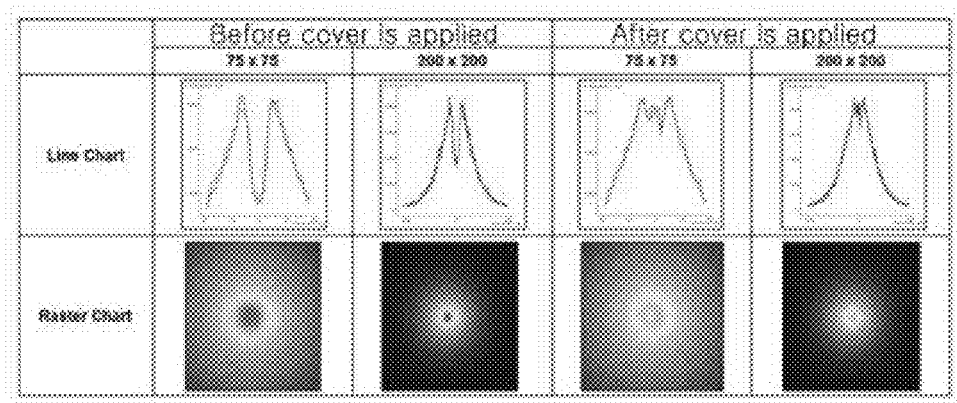

FIG. 8 illustrates the cases in which the window size is 75 mm×75 mm and 200 mm×200 mm. In these cases, it may be understood that the mura is improved, when the cover 122 is applied.

According to the embodiment of the present application, since the cover having the transmittance of 70% or less is arranged on the lens, the phenomenon in which the light is concentrated to the center portion of the light source can be improved, and the illumination uniformity can be ensured, and the cover region of the light emitting device can be increased.

The present application is directed to an optical element which improves mura and enhances illumination uniformity, and a light emitting device including the same.

According to an aspect of the present application, there is provided an optical element includes a lens including a surface of incidence on which light is incident from a light source, a first optical surface recessed toward the light source, and a second optical surface extending from the first optical surface; and a cover arranged on the lens to cover at least a part of the first optical surface and having a light transmittance of 70% or less.

According to another aspect of the present application, there is provided a light emitting device including a driving substrate; a plurality of light emitting elements arranged on the driving substrate; and a plurality of optical elements arranged on the plurality of light emitting elements to cover at least a part of each light emitting element, wherein the optical elements each include a lens including a surface of incidence on which light emitted from the light emitting element is incident, a first optical surface recessed toward the light emitting element, and a second optical surface extending from the first optical surface; and a cover arranged on the lens to cover at least a part of the first optical surface and having a light transmittance of 70% or less.

Terms including ordinal numbers such as "first," "second," etc. can be used to describe various components, but the components are not limited by those terms. The terms are used merely for the purpose of distinguishing one component from another. For example, a first component may be called a second component, and similarly, a second component may be called a first component without departing from the scope of rights of the invention. The term "and/or" encompasses combinations of a plurality of items or any one of the plurality of items.

It is to be noted that, in this specification, when a certain component is said to be connected to another component, the certain component may be directly connected to the other component, or a third component may be interposed therebetween. On the other hand, when a certain component is said to be directly connected to another component, no third component is interposed therebetween.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An optical element comprising;
   a lens including a surface of incidence on which light is incident from a light source, a first optical surface recessed toward the light source, and a second optical surface extending from the first optical surface; and
   a cover arranged on the lens to cover at least a part of the first optical surface,
   wherein a surface area of the cover is the same as or smaller than a cross-sectional area of the lens cut parallel to the cover,
   wherein the cover includes a plurality of through-holes which are uniformly distributed,
   wherein one of the plurality of through-holes is located on a center of the cover, and others of the plurality of through-holes are located on a plurality of concentric circles centering on a center of the cover,
   wherein the surface of incidence includes at least one convex portion formed to protrude toward a lower portion of the lens,
   wherein a bottom of the at least one convex portion is located below a lowermost portion of the second optical surface with respect to a position of the optical axis, and
   wherein an illumination distribution is controlled by adjusting a percent of light transmittance and a percent of light reflectance of the cover.

2. The optical element of claim 1, wherein the cover includes a reflecting sheet.

3. The optical element of claim 1, wherein the cover includes a diffusion sheet.

4. The optical element of claim 1, further comprising an adhesive member used to bond at least a part of the lens to the cover.

5. The optical element of claim 4, wherein an adhesive face between the cover and the lens has a width of 0.5 mm to 1 mm.

6. The optical element of claim 1, wherein the cover includes a substrate, and a coating layer formed on the substrate, and
   the substrate contains at least one of a polymethyl metaacrylate (PMMA) resin, a polyethylene terephthalate (PET) resin, a poly carbonate (PC) resin, a cycloolefin copolymer (COC) resin, and a polyethylene naphthalate (PEN) resin, and
   the coating layer contains a polymethyl methacrylate resin.

7. The light emitting device of claim 1, wherein the at least one convex portion refracts light which passes through the surface of incidence.

8. A light emitting device comprising:
   a driving substrate;
   a plurality of light emitting elements arranged on the driving substrate; and
   a plurality of optical elements arranged on the plurality of light emitting elements to cover at least a part of each light emitting element,
   wherein the optical elements each include a lens including a surface of incidence on which light emitted from the light emitting element is incident, a first optical surface recessed toward the light emitting element, and a second optical surface extending from the first optical surface; and a cover arranged on the lens to cover at least a part of the first optical surface,
   wherein a surface area of the cover is the same as or smaller than a cross-sectional area of the lens cut parallel to the cover,
   wherein the cover includes a plurality of through-holes which are uniformly distributed,
   wherein one of the plurality of through-holes is located on a center of the cover, and others of the plurality of through-holes are located on a plurality of concentric circles centering on a center of the cover,
   wherein the surface of incidence includes at least one convex portion formed to protrude toward a lower portion of the lens,
   wherein a bottom of the convex portion is located below a lowermost portion of the second optical surface with respect to a position of the optical axis, and
   wherein an illumination distribution is controlled by adjusting a percent of light transmittance and a percent of light reflectance of the cover.

9. The light emitting device of claim 8, wherein the cover includes a reflecting sheet.

10. The light emitting device of claim 8, wherein the cover includes a diffusion sheet.

11. The light emitting device of claim 8, wherein the at least one convex portion of the surface of incidence is spaced apart from each of the plurality of light emitting elements such that the bottom of the at least one convex portion is not provided directly over each of the plurality of light emitting elements.

* * * * *